(12) United States Patent
Goble

(10) Patent No.: US 10,993,381 B2
(45) Date of Patent: May 4, 2021

(54) PLANT CULTIVATION SYSTEM

(71) Applicant: Ryan Goble, Troy, MI (US)

(72) Inventor: Ryan Goble, Troy, MI (US)

(*) Notice: Subject to any disclaimer, the term of this patent is extended or adjusted under 35 U.S.C. 154(b) by 0 days.

(21) Appl. No.: 16/516,502

(22) Filed: Jul. 19, 2019

(65) Prior Publication Data

US 2019/0335677 A1  Nov. 7, 2019

Related U.S. Application Data

(63) Continuation of application No. PCT/US2018/014697, filed on Jan. 22, 2018.

(60) Provisional application No. 62/448,614, filed on Jan. 20, 2017.

(51) Int. Cl.
| | | |
|---|---|---|
| *A01G 7/04* | (2006.01) | |
| *A01G 9/24* | (2006.01) | |
| *A01G 9/02* | (2018.01) | |
| *A01G 9/14* | (2006.01) | |
| *A01G 27/00* | (2006.01) | |
| *A01G 9/00* | (2018.01) | |

(52) U.S. Cl.
CPC .............. *A01G 7/045* (2013.01); *A01G 9/024* (2013.01); *A01G 9/1407* (2013.01); *A01G 9/249* (2019.05); *A01G 27/005* (2013.01); *A01G 2009/003* (2013.01)

(58) Field of Classification Search
CPC ........ A01G 7/045; A01G 9/249; A01G 9/024; A01G 9/1407; A01G 27/005; A01G 9/20; A01G 9/24; A01G 9/247; A01G 9/26; A01G 9/242; A01G 7/04; A01G 9/14; A01G 9/12; A01G 17/04; A01G 17/06
See application file for complete search history.

(56) References Cited

U.S. PATENT DOCUMENTS

| | | | |
|---|---|---|---|
| 3,113,400 | A | 12/1963 | Emond |
| 31,133,400 | | 12/1963 | Emond |
| 4,026,068 | A | 5/1977 | Tepper |
| 4,922,653 | A | 5/1990 | Stone |
| 5,067,274 | A | 11/1991 | Lewis |
| 5,752,341 | A | 5/1998 | Goldfarb |
| 6,378,245 | B1 | 4/2002 | Summers |
| 7,017,299 | B1 | 3/2006 | Speed et al. |

(Continued)

OTHER PUBLICATIONS

International Search Report dated May 1, 2018 for International Application No. PCT/US2018/014697 filed Jan. 22, 2018.

*Primary Examiner* — Trinh T Nguyen
(74) *Attorney, Agent, or Firm* — Blue Filament Law PLLC

(57) ABSTRACT

A system and method are provided for the indoor and outdoor cultivation of larger fruiting plants. Improved lighting techniques, plant layouts, and space utilization are provided to improve the quality and yields of harvested products from large fruiting plants on a per plant and unit area basis. The uniformity of artificial light is improved from the top to the bottom of tall plants and vines, and overcome the lack of light penetration through the canopy of the plant by changing the orientation of lights from a horizontal to vertical alignment along the side of the plant verses over the top of the canopy, as well as increasing the number of light sources to reduce shading. Plants are trained to grow in specific directions and orientations in a grid system to enable an optimal and uniform light distribution and to improve space utilization in a given growing area.

11 Claims, 6 Drawing Sheets

(56) References Cited

U.S. PATENT DOCUMENTS

| | | | |
|---|---|---|---|
| 7,222,454 B1 * | 5/2007 | Chen | A01G 27/003 47/48.5 |
| 7,918,051 B2 * | 4/2011 | Early | A01G 9/026 211/118 |
| 8,196,347 B2 * | 6/2012 | Ariano | A01G 17/10 47/46 |
| 8,881,452 B2 | 11/2014 | Pacholyk et al. | |
| 8,925,246 B1 | 1/2015 | Stewart, Jr. | |
| 9,060,469 B2 | 6/2015 | Kamon, II | |
| 9,149,008 B1 | 10/2015 | Schemmel et al. | |
| 2005/0252076 A1 * | 11/2005 | Schloesser | A01G 17/06 47/46 |
| 2008/0313960 A1 | 12/2008 | Norvitch | |
| 2012/0090230 A1 | 4/2012 | Frost et al. | |
| 2012/0281413 A1 * | 11/2012 | Lewis | A01G 7/045 362/249.11 |
| 2013/0263503 A1 * | 10/2013 | Bostdorff | A01G 7/045 47/58.1 LS |
| 2014/0109474 A1 | 4/2014 | Reed, Jr. | |
| 2015/0113869 A1 | 4/2015 | Brown | |
| 2015/0264871 A1 * | 9/2015 | Finnerty | A01G 9/18 47/62 A |
| 2016/0165814 A1 | 6/2016 | Parrish | |
| 2016/0235014 A1 | 8/2016 | Donham et al. | |

* cited by examiner

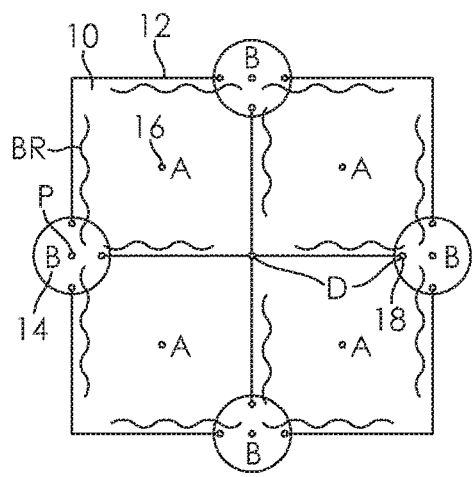
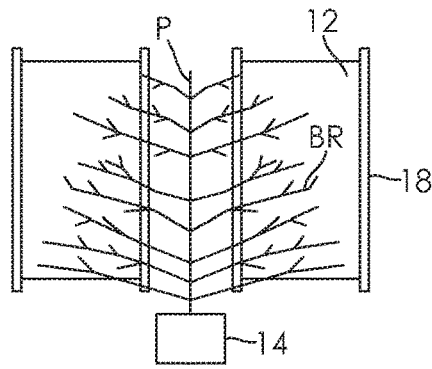
FIG. 2  FIG. 3
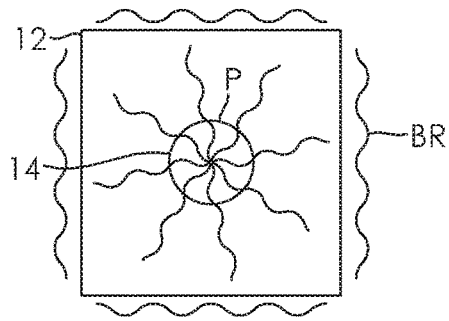
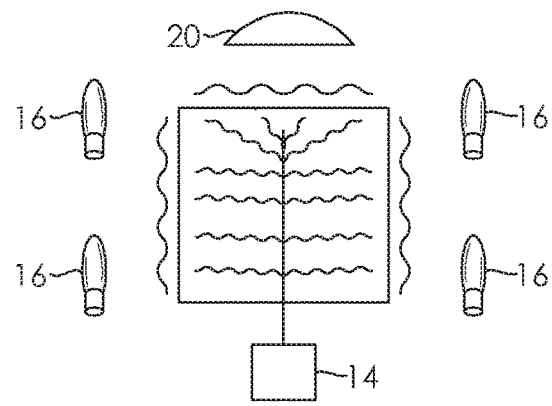
FIG. 4  FIG. 5
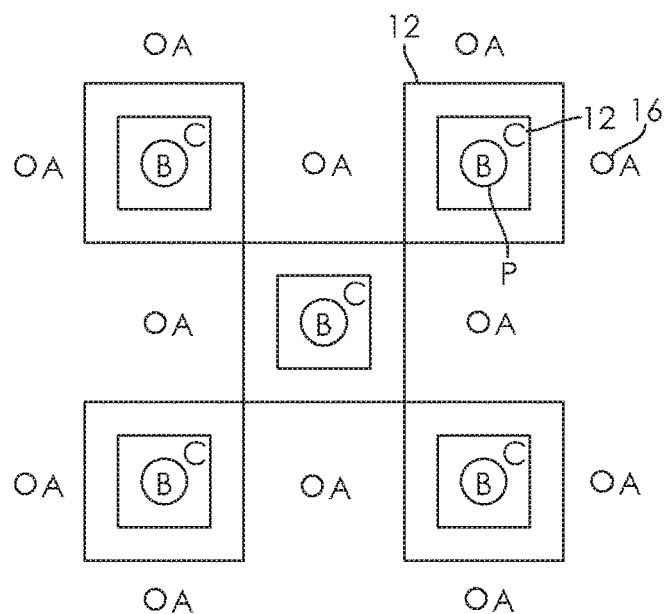
FIG. 6

PLANT CULTIVATION SYSTEM

CROSS-REFERENCE TO RELATED APPLICATION

This application is a bypass continuation application of PCT Application Serial Number PCT/US2018/014697 filed Jan. 22, 2018 that in turn claims priority of U.S. Provisional Patent Application Ser. No. 62/448,614 filed Jan. 20, 2017, which is incorporated herein by reference.

TECHNICAL FIELD

The present invention generally relates to the field of agriculture, and more specifically to a system and method for improving yields of larger fruiting plants.

BACKGROUND

The cultivation of larger fruiting plants generally results in a lack of light penetration into and through the upper portion or canopy of the plant to the lower regions of the plant. Light penetration to the lower portion of the plant is necessary in order to stimulate photosynthesis and therefore growth on the lower portion of the plant so as to increase health and yield. Fruit or flower sets are nonexistent on plant sites where light does not reach, else the fruit or flower sets are severely weakened and not viable for sale.

The use of artificial light sources in indoor cultivation differs from natural sunlight in that light from the sun does not diminish over distances. Plants illuminated by the sun receive the same amount of light at the bottom of the plant as the top of the plant as measured in lumens. Light sources for indoor cultivation are generally mounted above the canopy and have a drop off of light intensity of the reciprocal of the square of the distance between the light source and a given point. Shorter plants, around one foot tall, usually do not have an issue with light diminishment from top to bottom of the plant. However, problems arise when dealing with taller plants or vines. For example, the measurement of light received at the bottom of a six foot tall plant with an artificial light mounted two feet above the canopy will have an intensity close to thirty five times less than the light received at the canopy level. Table 1 illustrates typical light measurements in lumens for an artificial light source.

TABLE 1

Light density distribution for artificial light.

| Feet from bulb | lumens | |
|---|---|---|
| 1 | 140000 | |
| 2 | 70000 | top of plant |
| 3 | 35000 | |
| 4 | 17500 | |
| 5 | 8750 | |
| 6 | 4375 | |
| 7 | 2187.5 | bottom of plant |
| 8 | 1093.75 | |

It is also noted that even in instances where balanced illumination (as measured in lumens) is provided to the plant canopy there is still the issue of light penetration through the upper canopy of leaves to lower regions of the plant. On smaller plants, this is not an issue because the fruit is not far from the outer edges of the plant, however on a six foot tall and six foot wide plant the inner fruit sets often suffer from both a lack of illumination as well as shading of fruit sets from the outer canopy that causes the fruit to suffer in terms of quality, vigor, and overall development.

Thus, there exists a need for improved lighting techniques and plant layouts to improve the quality and yields per plant and the number of plants for a given area for cultivation of larger fruiting plants.

SUMMARY OF THE INVENTION

A cultivation system is provided that includes one or more cells where each cell has a series of walls that are vertical cages or mesh that hold a set of branches of a plant in a trained or splayed position via a set of securements. A plant growing container for cultivating the plant is in each of the one or more cells, with one or more vertical lighting elements positioned in the one or more cells providing illumination along a vertical axis of the plant; and a horizontal lighting element positioned above the canopy of the plant.

A method of using a cultivation system includes placing a plant in a growth container and positioning the growth container in a cell. The branches of the plant are splayed by securing the branches to the series of walls of the cell. One or more vertical lights are adjusted to provide uniform illumination to a vertical axis of the plant, and the canopy of the plant is illuminated with a horizontal light.

BRIEF DESCRIPTION OF THE DRAWINGS

The present invention is further detailed with respect to the following drawings that are intended to show certain aspects of the present of invention, but should not be construed as limit on the practice of the invention, wherein:

FIG. 2 is a top view of a four cell cultivation system in accordance with embodiments of the invention;

FIG. 3 is a side view of a plant splayed and attached to a vertical cage or mesh in accordance with embodiments of the invention;

FIG. 4 is a top view of a plant trained in a cube in accordance with embodiments of the invention;

FIG. 5 is a side view of a plant trained in a cube with horizontal and vertical lighting elements also shown in accordance with embodiments of the invention;

FIG. 6 is a top view of a multi-cell cultivation system showing the positioning of horizontal and vertical lighting elements in accordance with embodiments of the invention;

DETAILED DESCRIPTION OF THE INVENTION

Figure 1A:
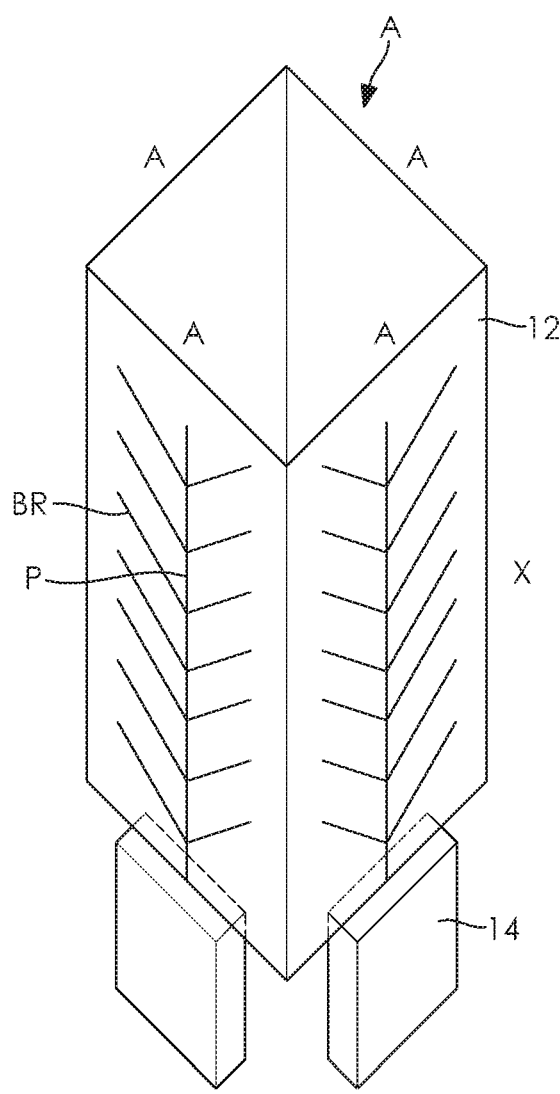
FIG. 1A is a perspective view of a single cell in a cultivation system in accordance with embodiments of the invention.

The present invention has utility as a system and method for the indoor and outdoor cultivation of larger fruiting plants. Embodiments of the inventive system and method provide improved lighting techniques, plant layouts, and space utilization to improve the quality and yields of harvested products from large fruiting plants on a per plant and unit area basis. Embodiments of the invention improve the uniformity of artificial light from the top to the bottom of tall plants and vines. Embodiments of the invention overcome the lack of light penetration through the canopy of the plant by changing the orientation of lights from a horizontal to vertical alignment along the side of the plant verses over the top of the canopy, as well as increasing the number of light sources to reduce shading. Non-limiting examples of artificial light sources illustratively include high pressure sodium, metal halide, ceramic metal halide, compact fluorescent; T12, T8, T5, high output T5 fluorescent tubes and bulbs; plasma, mercury vapor, light emitting diode (LED), duel arc bulbs, double ended bulbs, light emitting ceramic (LEC), incandescent, halogen, and gaseous discharge.

Furthermore, in embodiments of the inventive cultivation system, plants are trained to grow in specific directions and orientations in a grid system to enable an optimal and uniform light distribution to reach all parts of the plant and to improve space utilization in a given growing area.

Lighting is normalized to all parts of plant by vertically aligning lights and splaying or "espalier" of the plant to the grid formed with vertical cages or mesh with securements to allow the light to penetrate to all parts of the plant for maximum fruit production along with universal quality amongst all fruit bared by the plant. In specific embodiments, the vertical cages may be formed of plastic fencing, steel fencing, concrete remesh, string, and wire. In specific embodiments, the securements may be tie wraps or pieces of wire. Training of plant growth further includes selective pruning of the plant and removal of excess fan leaves were applicable per conventional techniques of espalier. Non-limiting examples of plants that have been seen to benefit from embodiments of the inventive cultivation system illustratively include tomatoes, peppers, raspberries, and miracle fruit trees.

Embodiments of the inventive cultivation systems may be used with various nutrient application systems and with environmental controls. Non-limiting examples of environmental parameters controlled in embodiments of the inventive cultivation system illustratively include temperature, humidity, carbon dioxide levels, oxygen levels, temperatures at fruit sites, and entry and exhaust of air in the growing area. Non limiting examples of plant growing containers and irrigation and nutrient delivery systems operable with the inventive cultivation system illustratively include undercurrent systems, ebb and flow systems, flood tables, buckets, nursery pots, bags, plastic bags, fabric bags (smartpots), nutrient film techniques, mpb bucket system, and net and mesh pots. Non-limiting examples of growing mediums for the plants grown with embodiments of the inventive cultivation system illustratively include pea gravel, coco coir, perlite, grow rocks, clay, soil, water, grow cubes, and mats.

Figure 1B:
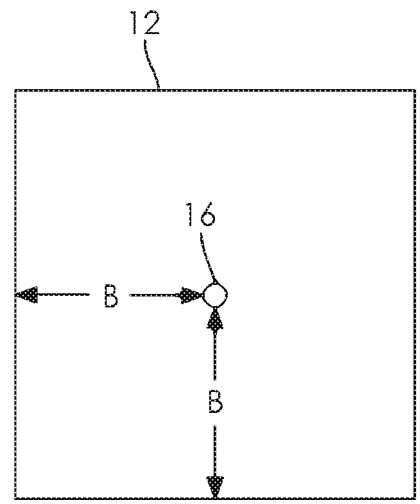
FIGS. 1B and 1C are a top view and a side view, respectively, of vertical lighting elements used in the single cell of FIG. 1A in accordance with embodiments of the invention.
Figure 1C:
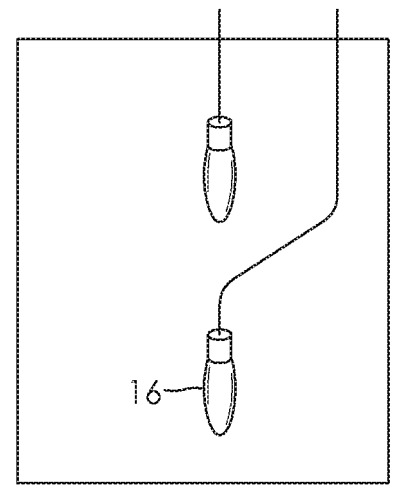
Figure 7A:
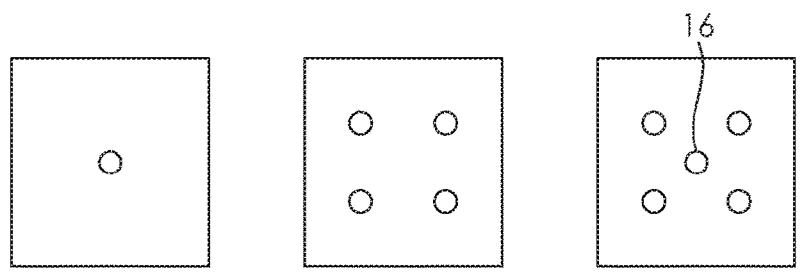
FIGS. 7A and 7B are top and side views, respectively, showing vertical light configurations in a cell in accordance with embodiments of the invention.
Figure 7B:
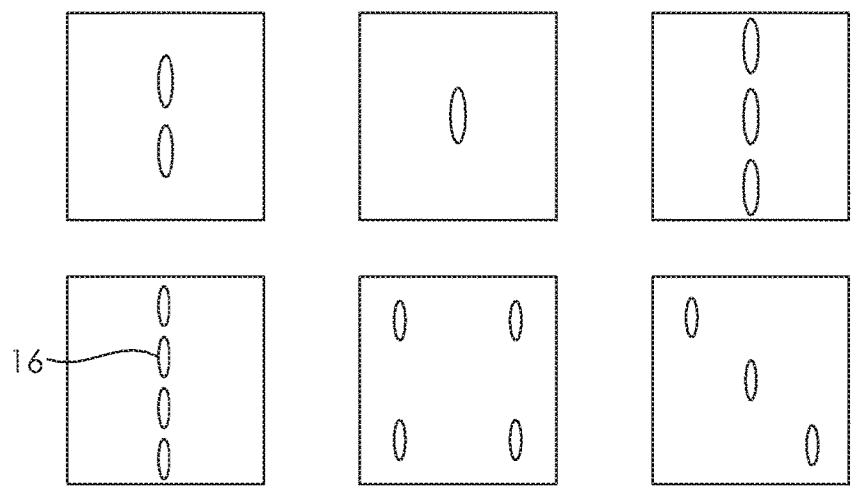
Figure 8A:
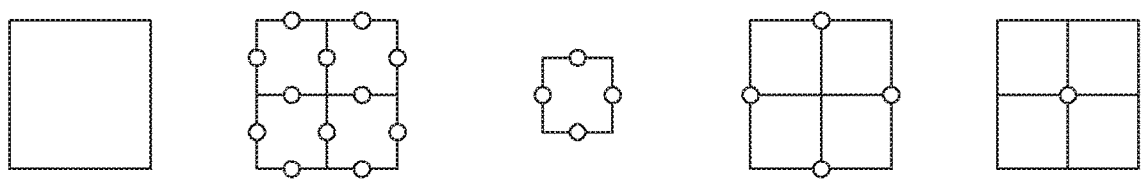
FIGS. 8A-8D are top views of square, rectangular, octagon, and circular cell cages, respectively, in accordance with embodiments of the invention.
Figure 8B:
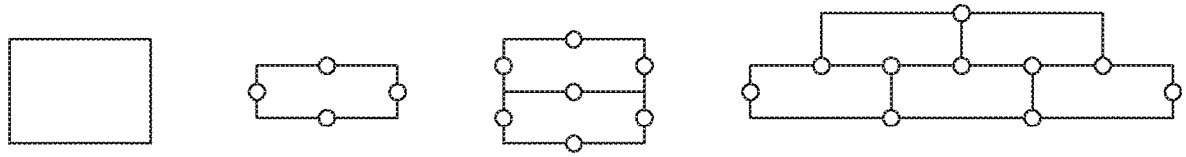
Figure 8C:
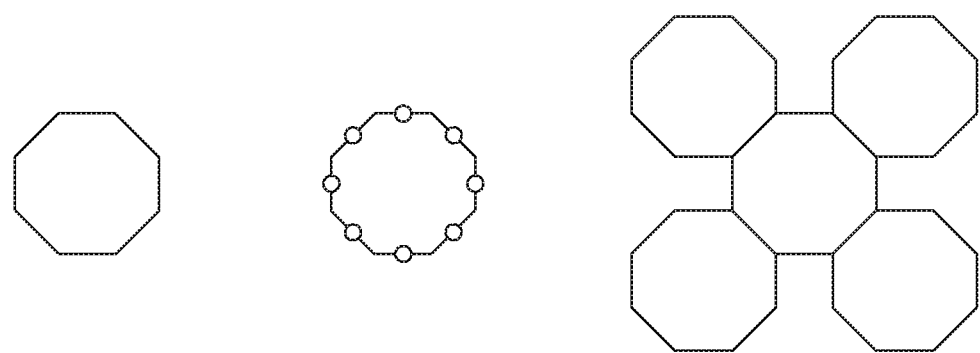
Figure 8D:
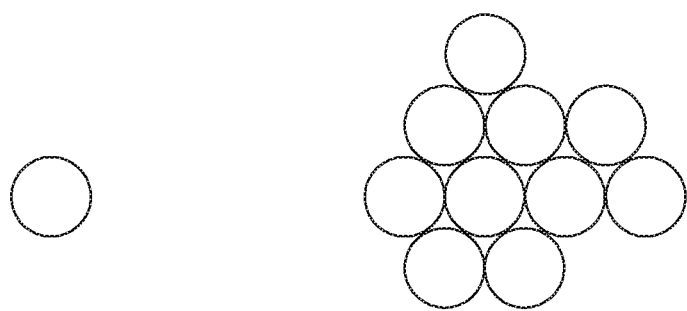
Figure 9:
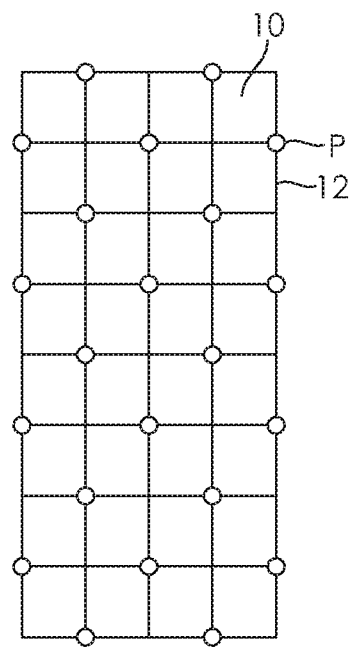
FIG. 9 illustrates a top view of a large floor plan of a cultivation system in accordance with embodiments of the invention.

Referring now to the figures, FIG. 1A is a perspective view of a single cell 10 of a cultivation system. It is appreciated that a cultivation system is made up of one or more cells 10. The cell 10 has a series of walls 12 that are vertical cages or mesh that hold the branches BR of the plant P in a splayed position. The plants P grow from a plant growing container and/or irrigation and nutrient delivery system 14. In a specific embodiment the height of the cell wall as represented by X is between one and ten feet, and the width of the cell as represented by A is between one and five feet. FIGS. 1B and 1C are a top view and a side view, respectively, of vertical lighting elements 16 used in the single cell of FIG. 1A. The vertical lighting elements 16 are centered in the cell 10 and hang downward from wires as best seen in FIG. 1C in a cascade. One or more vertical lighting elements 16 may be in a cell 10. FIG. 2 is a top view of a four cell cultivation system. FIG. 3 is a side view of a plant P splayed and the branches BR attached to a vertical cage or mesh 12 supported by vertical supports 18. FIG. 4 is a top view of a plant P trained in a cube. FIG. 5 is a side view of a plant P trained in a cube with horizontal lighting 20 and vertical lighting elements 16. FIG. 6 is a top view of a multi-cell cultivation system arranged in a grid showing the positioning of horizontal 20 and vertical lighting 16 elements in relation to the plants P. FIGS. 7A and 7B are top and side views, respectively, showing vertical light 16 configurations in a cell. FIGS. 8A-8D are top views of square, rectangular, octagon, and circular cell cages, respectively, that are arranged in various multi-cell layouts. As shown in FIGS. 8A-8D plant growth may be controlled in directions (espalier) not only along linear course, but arranging three or more walls 12 together to make triangular, square and other polyhedral shapes that are nourished via the middle area. FIG. 9 illustrates a top view of a large floor plan of a multi-cell cultivation system.

Figure 10A:
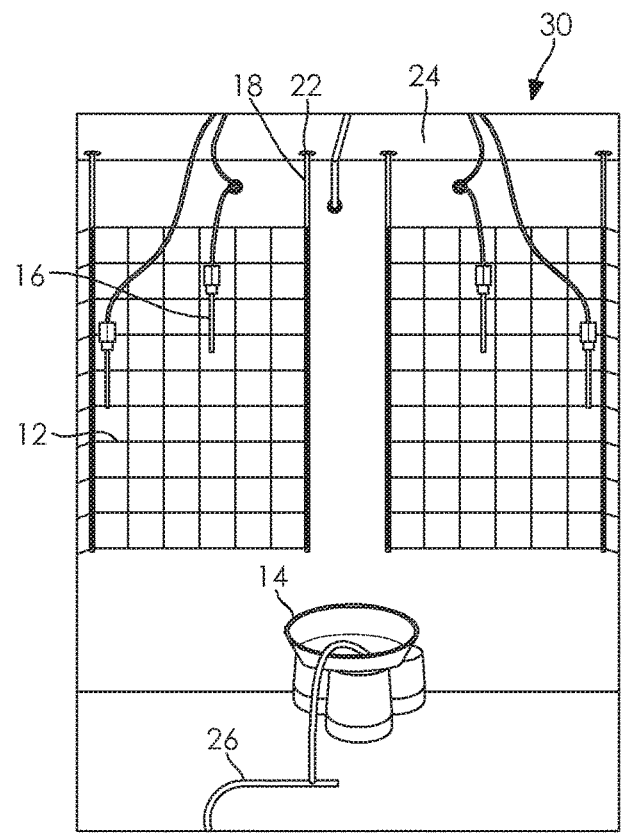
FIGS. 10A-10C are a series of photographs illustrating a cultivation system with the vertical cage or mesh wall supported by vertical supports that are secured to the ceiling in accordance with embodiments of the invention.
Figure 10B:
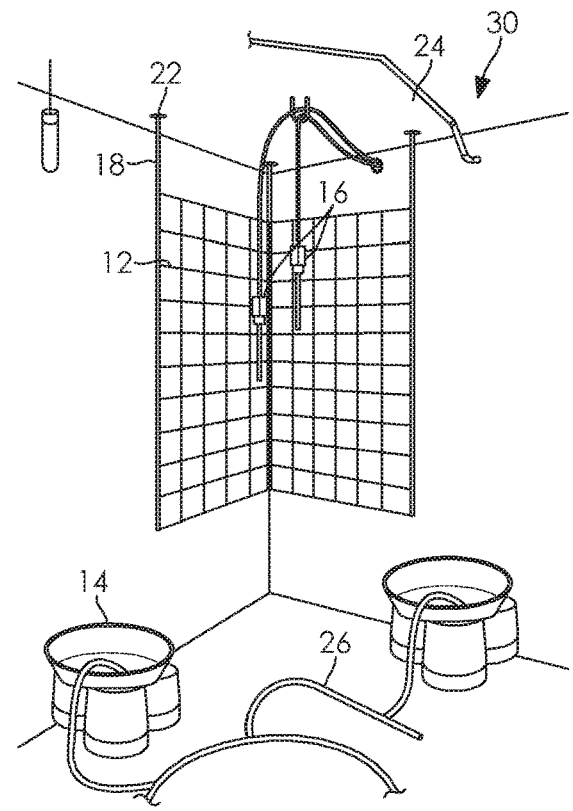
Figure 10C:
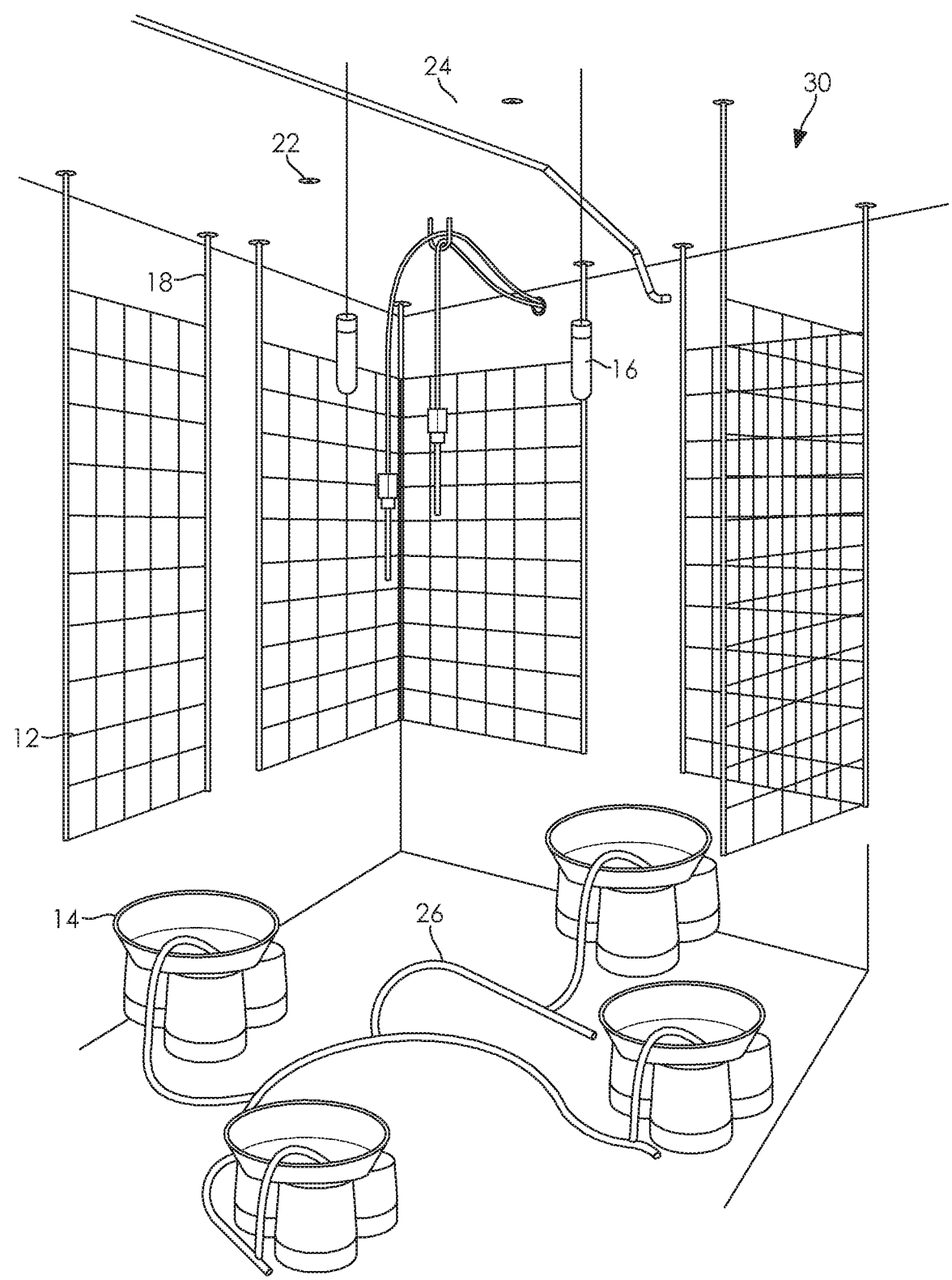

FIGS. 10A-10C are a series of photographs illustrating a cultivation system 30 set up in a large room with the vertical cage or mesh walls 12 supported by vertical supports 18 that are secured to the ceiling 24 with mounts 22. The vertical supports 18 may be configured to screw into or snap into the mounts 22. It is appreciated that the mounts 22 may also be placed in the floor. In a specific inventive embodiment, the mounts 22 may be placed in the walls of a growing room for plants that grow horizontally illustratively including vines. Also, visible in FIGS. 10A-10C are the vertical lights 16 hanging from the ceiling 24. In FIG. 10B the vertical lights 16 may be seen in a cascaded arrangement. Plant growing containers 14 are supplied with water and optionally other liquid or soluble nutrients via a network of irrigation tubing 26.

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

The invention claimed is:
1. A cultivation system comprising:
one or more cells where each cell has a series of walls that are vertical cages or mesh that are holding a set of branches of a plant in a trained or splayed position via a set of securements each cell being triangular, square and a polyhedral shape an having an open top;

a plant growing container for cultivating the plant in each of the one or more cells said vertical cages resting on said plant growing container or hung from a ceiling;

one or more vertical lighting elements positioned in the one or more cells providing uniform illumination along a vertical axis of the plant; and a horizontal lighting element positioned above the canopy of the plant.

2. The cultivation system of claim 1 wherein the vertical lighting elements and the horizontal lighting elements are one or more of: high pressure sodium, metal halide, ceramic metal halide, compact fluorescent; T12, T8, T5, high output T5 fluorescent tubes and bulbs; plasma, mercury vapor, light emitting diode (LED), duel arc bulbs, double ended bulbs, light emitting ceramic (LEC), incandescent, halogen, or gaseous discharge.

3. The cultivation system of claim 1 wherein the vertical cages are formed of at least one of plastic fencing, steel fencing, concrete remesh, string, or wire.

4. The cultivation system of claim 1 further comprising a series mounts in the ceiling where a set of vertical supports are adapted to screw into or snap into the mounts to support the vertical cages.

5. The cultivation system of claim 1 further comprising a nutrient application system.

6. The cultivation system of claim 5 wherein the plant growing container and the nutrient application system is one of: undercurrent systems, ebb and flow systems, flood tables, buckets, nursery pots, bags, plastic bags, fabric bags (smart-pots), nutrient film techniques, mpb bucket system, net pots, or mesh pots.

7. The cultivation system of claim 1 further comprising environmental controls that control temperature, humidity, carbon dioxide levels, oxygen levels, temperatures at one or more fruit sites on the plant, and entry and exhaust of air in the one or more cells.

8. The cultivation system of claim 1 wherein the plant growing container further comprises a growing medium.

9. The cultivation system of claim 8 wherein the growing medium is at least one of pea gravel, coco coir, perlite, grow rocks, clay, soil, water, grow cubes, and mats.

10. A method of using the system of claim 1 comprising:
placing a plant in a growth container and positioning the growth container in a cell;
splaying the branches of the plant and securing the branches to the series of walls of the cell;
adjusting the one or more vertical lights to provide uniform illumination to a vertical axis of the plant; and
illuminating the canopy of the plant with the horizontal light.

11. The method of claim 10 further comprising training growth of the plant and selective pruning of the plant and removal of excess fan leaves.

* * * * *